(12) United States Patent
Watkins et al.

(10) Patent No.: US 6,870,609 B2
(45) Date of Patent: Mar. 22, 2005

(54) CONFOCAL 3D INSPECTION SYSTEM AND PROCESS

(75) Inventors: Cory Watkins, Chanhassen, MN (US); David Vaughnn, Edina, MN (US)

(73) Assignee: August Technology Corp., Bloomington, MN (US)

( * ) Notice: Subject to any disclaimer, the term of this patent is extended or adjusted under 35 U.S.C. 154(b) by 38 days.

(21) Appl. No.: 10/073,613

(22) Filed: Feb. 11, 2002

(65) Prior Publication Data

US 2003/0052346 A1 Mar. 20, 2003

Related U.S. Application Data

(60) Provisional application No. 60/268,114, filed on Feb. 9, 2001.

(51) Int. Cl.[7] ............................................. G01N 21/00
(52) U.S. Cl. ............................ 356/237.1; 356/237.4; 438/14; 359/368; 250/559.4
(58) Field of Search ........................... 356/237.1–237.5; 359/235, 368, 638, 386, 833; 348/126; 250/559.29, 559.41, 559.46, 559.4; 438/14–16; 257/283

(56) References Cited

U.S. PATENT DOCUMENTS

| | | |
|---|---|---|
| 4,719,341 A | 1/1988 | Hoogenboom |
| RE32,660 E | 5/1988 | Lindow et al. |
| 4,802,748 A | 2/1989 | McCarthy et al. |
| 4,930,896 A | 6/1990 | Horikawa |
| 4,965,442 A | 10/1990 | Girod et al. |
| 5,067,805 A | 11/1991 | Corle et al. |
| 5,072,128 A | 12/1991 | Hayano et al. |
| 5,073,018 A | 12/1991 | Kino et al. |
| 5,083,220 A | 1/1992 | Hill |
| 5,248,876 A | 9/1993 | Kerstens et al. |
| 5,329,358 A | 7/1994 | Horijon |
| 5,386,317 A | 1/1995 | Corle et al. |
| 5,408,294 A * | 4/1995 | Lam ............................ 355/22 |
| 5,428,475 A | 6/1995 | Tanaami et al. |
| 5,448,359 A | 9/1995 | Schick et al. |
| 5,594,242 A | 1/1997 | Konishi et al. |
| 5,696,591 A | 12/1997 | Bilhorn et al. |
| 5,734,497 A | 3/1998 | Yano et al. |
| 5,737,084 A | 4/1998 | Ishihara |
| 5,991,040 A | 11/1999 | Doemens et al. |
| 6,108,090 A | 8/2000 | Ishihara |
| 6,224,276 B1 | 5/2001 | Funayama et al. |
| 6,288,382 B1 | 9/2001 | Ishihara |
| 6,426,835 B1 | 7/2002 | Endo et al. |

FOREIGN PATENT DOCUMENTS

| | | |
|---|---|---|
| DE | 1 949 117 | 9/1969 |
| EP | 0 615607 | 11/1992 |
| WO | WO 92/14118 | 8/1992 |
| WO | WO 93/11403 | 6/1993 |
| WO | WO 03/008940 | 1/2003 |

OTHER PUBLICATIONS

A copy of PCT International Search Report mailed on Jan. 2, 2003 (7 pages).

* cited by examiner

Primary Examiner—Hoa Q. Pham
(74) Attorney, Agent, or Firm—Dicke, Billig & Czaja, PLLC

(57) ABSTRACT

A confocal three dimensional inspection system, and process for use thereof, allows for inspecting of bumps and other three dimensional (3D) features on wafers and other semiconductor substrates. The sensor eliminates out of focus light using a confocal principal to improve depth response.

6 Claims, 1 Drawing Sheet

CONFOCAL 3D INSPECTION SYSTEM AND PROCESS

This application claims the benefit of Provisional Application No. 60/268,114, filed Feb. 9, 2001.

BACKGROUND OF THE INVENTION

1. Technical Field

The present invention relates to a system, and process for use thereof, for inspecting wafers and other semiconductor or microelectronic substrates, and specifically for inspecting three dimensional (3D) surfaces or features thereon such as bumps. Specifically, the present invention relates to a confocal optical system for inspecting bumps and other 3D features on wafers or like substrates, and a process of using such system.

2. Background Information

Over the past several decades, the microelectronics and semiconductor has exponentially grown in use and popularity. Microelectronics and semiconductors have in effect revolutionized society by introducing computers, electronic advances, and generally revolutionizing many previously difficult, expensive and/or time consuming mechanical processes into simplistic and quick electronic processes. This boom has been fueled by an insatiable desire by business and individuals for computers and electronics, and more particularly, faster, more advanced computers and electronics whether it be on an assembly line, on test equipment in a lab, on the personal computer at one's desk, or in the home via electronics and toys.

The manufacturers of microelectronics and semiconductors have made vast improvements in end product quality, speed and performance as well as in manufacturing process quality, speed and performance. However, there continues to be demand for faster, more reliable and higher performing semiconductors.

One process that has evolved over the past decade plus is the microelectronic and semiconductor inspection process. The merit in inspecting microelectronics and semiconductors throughout the manufacturing process is obvious in that bad wafers may be removed at the various steps rather than processed to completion only to find out a defect exists either by end inspection or by failure during use. In the beginning, wafers and like substrates were manually inspected such as by humans using microscopes. As the process has evolved, many different systems, devices, apparatus, and methods have been developed to automate this process such as the method developed by August Technology and disclosed in U.S. patent application Ser. No. 09/352,564. Many of these automated inspection systems, devices, apparatus, and methods focus on two dimensional inspection, that is inspection of wafers or substrates that are substantially or mostly planar in nature.

One rapidly growing area in the semiconductor industry is the use of bumps or other three dimensional (3D) features that protrude outward from the wafer or substrate. The manufacturers, processors, and users of such wafers or like substrates having bumps or other three dimensional features or projections desire to inspect these wafers or like substrates in the same or similar manner as the inspection of the two dimensional substrates. However, many obstacles exist as the significant height of bumps or the like causes focusing problems, shadowing problems, and just general depth perception problems. Many of the current systems, devices, apparatus, and methods are either completely insufficient to handle these problems or cannot satisfy the speed, accuracy, and other requirements.

SUMMARY OF THE INVENTION

The inspecting of semiconductors or like substrates, and specifically the inspection of three dimensional surfaces or features, such as bumps, is accomplished by the present invention, which is a confocal sensor with a given depth response functioning using the principle of eliminating out of focus light thereby resulting in the sensor producing a signal only when the surface being inspected is in a narrow focal range. The result is an accurate height determination for a given point or area being inspected such that the cumulation of a plurality of height determinations from use of the confocal sensor system across a large surface allows the user to determine the topography thereof.

In sum, this system and process creates multiple parallel confocal optical paths whereby the out of focus light is eliminated by placing an aperture at a plane which is a conjugate focal plane to the surface of the sample. The result is that the sensor produces a signal only when the sample surface is in a narrow focal range.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
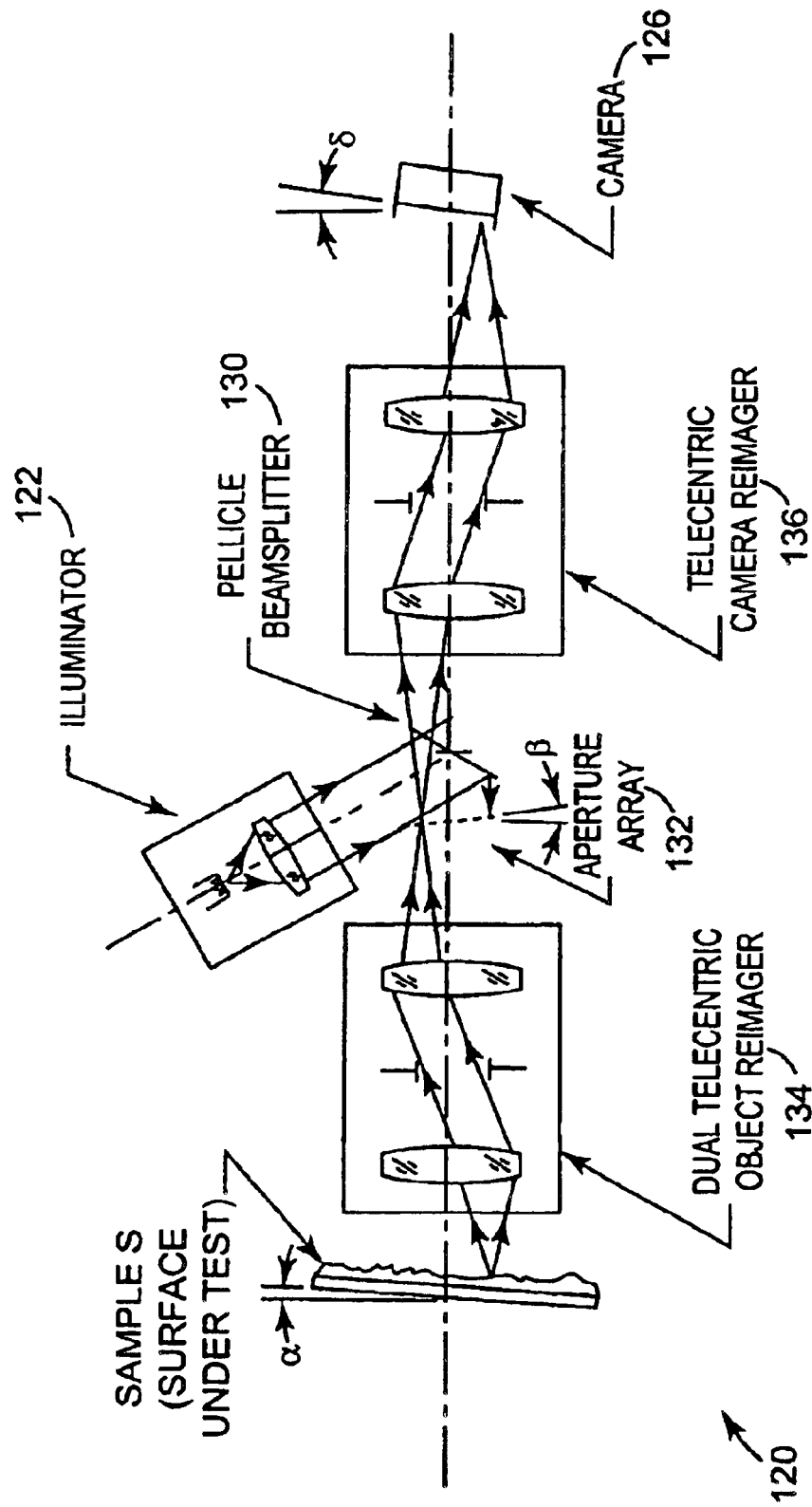
FIG. 1 is a drawing of one embodiment of the present invention.

The three dimensional (3D) inspection system of the present invention is indicated generally at 120 as is best shown overall in FIG. 1 and is used in one environment to view, inspect, or otherwise optically measure three dimensional features or surfaces. One example is the measurement of bumps on wafers or like substrates. The 3D inspection system includes a light source 122, an optical subsystem 124, and a camera 126. The optical subsystem includes a beamsplitter 130, an aperture array 132, an object reimager 134, and a camera reimager 136.

The light source 122 is any source of light that provides sufficient light to illuminate the sample S, and the light source may be positioned in any position so long as it provides the necessary light to sample S to be viewed, inspected or otherwise optically observed. Examples of the light source include, but are not limited to white light sources such as halogen or arc lights, lasers, light emitting diodes (LEDs) including white LEDs or any of the various colored LEDs, fluorescent lights, or any other type of light source.

In the preferred embodiment, the light source 122 is an incoherent light source, preferably of an incandescent type. In one embodiment, which is most preferred and is shown in the Figures, the light source is an incandescent quartz style halogen lamp. The light source is of a Kohler design, and specifically a reimaged Kohler design, which effectively matches the telecentric properties of the optical subsystem thereby matching the numerical aperture and field properties needed by the system 120 to produce accurate height measurements of bumps on the surface of the sample S.

The Kohler illumination design (1) maps the pupil of light source onto spatial extension of aperture array, and (2) maps spatial extension of filament in light source into numerical aperture or angle space of the reimaging system. The reimaged Kohler design differs from a standard Kohler design in two ways: (1) reimaged Kohler designs have a filament that is reimaged to a circular aperture that very precisely defines a constant numerical aperture over an entire field, and (2) in between the filament and the sample there is a focal plane that is conjugated to the aperture array, and at that focal plane the light is baffled and masked so that light outside of the desired range at the aperture array never enters the system. One baffle defines the numerical aperture and another baffle limits the light that passes through to only the desired field of view.

This light source provides sufficient energy to illuminate the sample S and is typically filtered. The light emitted from the light source 122 is directed into the optical subsystem 122. Specifically the light is directed toward beamsplitter 130.

In more detail and in the embodiment shown in the Figures, the optical subsystem 124 includes beamsplitter 130, aperture array 132, object reimager 134, and camera reimager 136.

Beamsplitter 130 in the embodiment shown is a pellicle beamsplitter. A pellicle beamsplitter has several advantages since it is achromatic, has very low polarization effects, and less variation with angle and color issues, and more uniformly provides light even after beam splitting effects than a polarized beamsplitter.

Another important feature is the design, setup, alignment and configuration of the light source 122, pellicle beam splitter 130 and the aperture array 132 as is shown in the FIG. 1. The light or illumination source 122 provides reflected light to the beamsplitter whereby some of this light passes through the beamsplitter and eminates out of the entire system and is lost, a small amount may be lost within the beamsplitter, and the remaining light is reflected toward the aperture array.

The beamsplitter 130 is pellicle and is of a broadband configuration. In contrast to a polarizing beamsplitter where incoming light is reflected at 90 degrees to the path of at least one of the paths of outgoing light such that incoming and all exiting light are basically near normal incident to the faces of the cube, the pellicle beamsplitter in this embodiment overcomes the detrimental design limitations of a typical cube beamsplitter of any type including either an achromatic or chromatic type. This broadband configuration is necessary because in a typical achromatic beamsplitter it is difficult to successfully achieve very small fresnel reflections on the surfaces unless the beamsplitter includes coatings that adopt broad wavelength ranges which are very expensive, very sophisticated and difficult to provide.

Aperture array 132 in the embodiment shown is an opaque pinhole array. Specifically, the aperture array is chrome on glass with the pinholes etched out of side facing the sample S (chrome side) while the reflective side faces the beamsplitter. Either one or both sides of the array in one alternative embodiment include an anti-reflective (A/R) coating.

The pinhole array in the most preferred embodiment is an approximately 100 pinhole by an approximately 1000 pinhole array, where the holes in this embodiment are of a circular nature although other configurations are contemplated. However, other aperture, pinhole or like arrays of differing numbers and ranges of holes are contemplated.

The aperture array is slightly canted as shown by β. This canting results in the directing or steering away of stray reflections in directions that do not effect the system. For instance, the canting keeps light reflected from the pellicle toward the aperture array that does not pass through a pinhole in the array from being reflected back into the camera reimager and camera. In the embodiment shown the canting a is preferably either 4.5 degrees or 5.5 degrees although it may be at other angles between 0.1 degree and 25 degrees. As discovered, the greater the cant angle the easier it is to remove stray light such as that caused by the reflection from the chrome surface; however, canting too much introduces other negative effects.

The pinholes in the aperture array are optimized in terms of size and pitch. In one embodiment, the size of the pinholes matches the camera pixels, that is the size of each pinhole matches the diffraction size of the spot coming back from the object reimager.

However, in another embodiment, oversampling is used meaning the system has more pinholes than camera pixels, and as such more than one pinhole is mapped or correlated into each pixel. In yet another embodiment that is preferred, undersampling is used meaning the system has more camera pixels than pinholes, and as such less than pinhole is mapped or correlated into each pixel. This undersampling reduces the effects of aliasing in the system so that holes do not have to match up directly with the pixels and thus alignment, distortions, and imperfections in optical system and other similar issues are avoided because this design assures that the same or substantially the same amount of light reaches each pixel regardless of the orientation, phase, etc. of the pixel with respect to a pinhole. The undersampling also broadens the depth response profile of our optical system to allow the system to operate over a broad range of three dimensional heights on the sample S.

In addition, in one embodiment the apertures are orthogonal or grid-like. However, in alternative embodiments the apertures are non-orthogonal or non-grid-like such as a hexagonal or other geometric pattern. This non-orthogonal pattern in at least certain applications reduces aliasing and alignment issues.

Pitch is preferably calculated from pinhole size which is optimized to numerical aperture size. The pinhole size is chosen inter alia to match the diffraction of the object reimager. The pitch is twice the pinhole size which optimizes the reduction of cross talk between pinholes while maximizing the number of resolution elements. Magnification and spatial coverage may then be adjusted to optimize resolution at the wafer surface.

Another key feature of this invention is that light passing from the aperture array is in transmission so that any surface anomalies on the pellicle beamsplitter are irrelevant to the imaging properties of our system and we are not susceptible to vibrations of pellicle beamsplitter.

The positioning of the aperture array into the system provides a confocal response. Only light that passes through an aperture in the aperture array, passes through the dual telecentric object reimager, reflects off of the sample S, passes back through the dual telecentric object imager, and passes back through an aperture in the aperture array is in focus. This confocal principle results in bright illumination of a feature in focus while dim or no illumination of an out of focus feature.

Aperture array in the preferred embodiment is a fused-silica material such as chrome on glass because of the low coefficient of thermal expansion. It may alternatively be made of any other material having a low coefficient of thermal expansion such as air apertures, black materials, etc.

This eliminates a mismatch potential between pixel sizes and the CCD camera elements.

The object reimager 134 in the preferred embodiment shown is of a dual telecentric design. The object reimager includes a plurality of lenses separated by a stop. In one embodiment, the object reimager includes two to six lenses, and preferably three to four, on the right side of the reimager and two to six lenses, and preferably three to four, on the left side of the reimager separated in the middle by the stop. Since the reimager is dual telecentric, the stop is located one group focal length away from the cumulative location of the lenses on each side.

The object reimager functions to: (1) provide a front path for the light or illumination to pass from the aperture array to the object (wafer or sample S), and (2) provide a back path for the reimaging of the object (wafer or other sample S) to the aperture array 132.

This system is unique because it is a dual telecentric optical reimager. This dual telecentric property means that when viewed from both ends the pupil is at inifinity and that the chief rays across the entire field of view are all parallel to the optical axis. This provides two major benefits. One benefit which relates to the object or sample end of the reimager is that magnification across the field remains constant as the objectives focus in and out in relation to the sample. The second benefit relates to the aperture end of the reimager where the light that comes through the aperture array is collected efficiently as the telecentric object reimager aligns with the telecentric camera reimager.

The optical throughput is very high. This is a result of a numerical aperture of the system on the object side is in excess of 0.23 with a field of view on the object of 5 mm.

In an alternative embodiment, the numerical aperture of the object reimager may be adjustable or changeable by placing a mechanized iris in for the stop. This would allow for different depth response profile widths. This allows for broader ranges of bump or three dimensional measurements since the taller the object that it is desirable to measure the lower the desirable numerical aperture to maintain speed of the system. Similarly the smaller the object to be measured, the more desirable it is to have a higher numerical aperture to maintain sharpness, i.e., accuracy.

The magnifications of the object reimager are variable and a function of the focal length of a chosen objective. This is useful for tailoring the magnification to a variety of samples.

The camera reimager 136 in the preferred embodiment shown is of a telecentric design. The camera reimager includes a plurality of lenses separated by a stop. In one embodiment, the camera reimager includes two to six lenses, and preferably three to four, on the right side of the reimager and two to six lenses, and preferably three to four, on the left side of the reimager separated in the middle by the stop. Since the reimager is telecentric, on the telecentric side which is the side nearest the pellicle beamsplitter, the stop is located one group focal length away from the cumulative location of the lenses on that side.

The camera reimager functions to provide a path for the light passing through the aperture array from the object reimager to the camera.

The telecentric properties of the camera reimager are on the aperture array side or end so that it efficiently and uniformly across the field of view couples the light coming through the aperture array from the object reimager 134. It is pixel sampling resolution limited so its aberrations are less than that from the degradation of the pixel sampling. Its numerical aperture is designed based upon the object reimager so any misalignments between the reimagers do not translate into a field dependent change in efficiency across the field of view.

The combined system magnification of the object and camera reiamgers is chosen to match spatial resolution at the object to pixel size.

The magnifications of the camera reimager are 0.65×. The CCD or detector array is 0.65 times the aperture array. Thus, the preferred object and camera reimager magnification is 2.6×.

In addition, an optional feature in this invention that is used in certain embodiments is the canting of either the sample S with reference to the optical axis of the entire optical subsystem, or vice versa (that is the canting of the entire optical subsystem with respect to the sample S). This option compensates for the canting of the aperture array as described above thus maintaining the Scheimpflug condition. In the Figure, the canting is shown as α. In one embodiment, this cant angle α is 1.2 degrees.

It is also an option not to cant the sample or the optical subsystem when the aperture array is canted. In this scenario, some desensitivity of the signal occurs but is often not significant or noteworthy.

The camera 126 may be any line scan camera, area scan camera, combination of multiple line scan cameras, time delay integration (TDI) line scan camera or other camera or cameras as one of skill in the art would recognize as functionally operational herewith.

In the embodiment shown in the Figures, the camera 126 is a TDI camera. TDI provides additional speed by transferring the charge such that the system integrates light over time. The aperture array with line scan camera uses only one array of pinholes while with TDI the aperture array is 100 or more arrays by multiple apertures in each line (an example is 100 lines by 1024 apertures per line).

Sampling or viewing may be 1:1 or at another ratio. Where at 1:1, the camera operates at a 1 pinhole to 1 pixel ratio. Where undersampling is used, the camera is at a ratio other that 1:1 pinholes to pixels, and in one embodiment is at 1½ or 2 pinholes per pixel element at the camera sensor.

Light passes through the system as follows: Light source 122 illuminates and directs such light toward beamsplitter 130. Some of the light that reaches the beamsplitter passes through the beamsplitter and eminates out of the entire system thus avoiding interference with the system, a small amount is lost within the beamsplitter, and the remaining light is reflected toward the aperture array. Light that reaches the aperture array either passes through an aperture therein, or hits the plate around the holes in the aperture array and is reflected out of the system due to the cant. Light that passed through the aperture array is reimaged and collimated in the dual telecentric object reimager. The light is directed toward the sample S and reflects off of the sample S. If the point that is illuminated is in or near focus, substantially all of the light reflects back into the object reimager while if not in focus then little or none is reflected back. Light passes back through the object reimager and is directed toward the aperture array. Light that reaches the aperture array either passes through an aperture therein, or hits the plate around the holes in the aperture array and is reflected out of the system due to the cant. Light that passed through the aperture array is in focus due to the confocal principle, and it is reimaged and collimated in the telecentric camera reimager. It is directed into the camera and the intensity recorded. In any given pass, the above process occurs for every point on the sample that is being viewed.

The light that passes through the system is received by camera 126 and stored. After this process has been repeated at different heights, and across at least a portion of the surface, all of the stored data is then processed by a computer or the like to calculate or determine the topography of the sample including the location, size, shape, contour, roughness, and/or metrology of the bumps or other three dimensional features thereon.

In one of the current design and embodiment for bumps or other three dimensional features, the process involves two or more (generally three or more) passes over the sample surface S each at a different surface target elevation to measure surface elevation followed by two or more (generally three or more) passes each at a different bump target elevations to measure bump elevation followed by calculations to determine bump height. The result of the passes is an intensity measurement for each point at each elevation where these points as to surface elevation and separately as to bump elevation are plotted or fitted to a Gaussian or other curve to determine the elevation of both the surface and the bump from which the actual bump height at a given point is determined. It is the difference between the surface elevation and the bump elevation.

In more detail, a pass is made over a portion or the entire surface of the sample S. Intensity is determined for each pixel. Initially, a course or approximate surface elevation is used that is approximating the surface location or elevation of the sample S. The entire sample (or portion it is desired to measure) is scanned and the intensities are noted for each pixel, while if very small or no intensity at a given point then the system is significantly out of focus at that location or pixel (an example is scanning at the surface elevation where bumps exists results in little or no intensity feedback). This step is generally repeated twice more (though any number of passes may be used so long as a curve can be calculated from the number of passes) at a slightly different elevation such as 5, 10 or 20 microns difference in elevation to the first pass. The result is three data points of intensity for each pixel to plot or fit a Gaussian or other curve to determine the actual wafer surface elevation at that location. The wafer surface elevation is now known for the entire sample except where bumps or other significant three dimensional protrusions or valleys exist since each of these reported no intensity as they were too out of focus to reflect back any light. Curve fitting may be used to determine surface location under the bumps.

The second step is to determine the elevation of these significant protrusions or valleys (such as bumps). Another pass is made over a portion or the entire surface of the sample S (often only where bumps are expected, known, or no intensity was found in the surface elevation passes). This pass occurs at a course or rough approximation as to the elevation of the expected bumps such as 50, 100, 200, 300 or the like microns above the surface. Intensity is determined at each pixel as the entire sample (or only select locations where bumps are expected, known or no intensity was previously found) is scanned and the intensities are noted for each pixel, while if very small or no intensity at a given point then the system is significantly out of focus at that location or pixel (an example is scanning at bump elevations where no bump exists results in little or no intensity feedback). This step is generally repeated several more times (though any number of passes may be used so long as a curve can be calculated from the number of passes) at a slightly different elevation such as 5, 10 or 20 microns different. The result is multiple data points of intensity for each pixel to plot or fit a Gaussian or other curve to determine the bump elevation at that point.

Once the surface elevations are known and the bump elevations are known, the bump heights can be determined. The surface elevations are determined for the bump location based upon analysis, plotting, and/or other known curve extension techniques of all of the proximate surface elevations around the bump. The difference between a bump elevation and the proximate surface elevations therearound, or the bump elevation and the calculated surface elevation thereunder, equate to the bump height for a given bump.

In sum, the scanning process for the above invention is as follows: The system will scan lines across the sample surface S at a fixed elevation above the sample surface S. This scan will generate one z axis elevation on a depth response curve for each pixel on the sample under the scan. The sensor will then be moved in the z axis direction to a second elevation and the scan will be repeated to generate a second z axis elevation on the depth response curve for each location on the sample S under the scan. This can then be repeated any number of times desired for the interpolation method used (typically at least two or three scans, although more are certainly contemplated and will improve accuracy). The multiple locations on the depth response curve are then interpolated for each pixel to generate a map of the surface height under the scan. The elevation of the sample surface S is now known.

In the case of significant three dimensional protrusions (such as bumps), this process may be repeated at the approximate elevation of the outermost portion of the protrusions just as it was performed above at the approximate elevation of the sample surface S. The bump elevations will then be known, and the bump heights are then calculated as the difference between the surface elevation and the bump elevation.

It is important to understand that the size of the "in focus" region is determined by the telecentric object reimager. If this lens has a larger numerical aperture, the focus range will be small, and conversely if the lens has a low numerical aperture the focus range will be large. The best in focus range is dependent on the elevation range that needs to be measured.

The invention also in at least one embodiment is capable of adjusting depth response. This is desirous since with larger bumps a broader depth response is desirable while with smaller bumps a thinner or smaller depth response is desired. In effect, the system degrades the high numerical aperture to look at larger or taller bumps, and this assists in maintaining speed. Inversely, to view smaller or thinner bumps it is desirable to provide a higher numerical aperture. This broadening of depth response is accomplished either by stopping down the aperture, by providing or increasing the tilt of the sensor, or by utilizing a different focal length objective lens.

A significantly different alternative involves imaging multiple heights at each point rather than making multiple passes. This is accomplished by using multi-line line scan cameras where each camera or sensor is looking at different heights. For example, a four line scan camera system would involve line 1 reading elevation 0, line 2 reading elevation plus 20 microns, line 3 reading elevation plus 40 microns, and line 4 reading elevation plus 60 microns. All four data points in this example are gathered simultaneously. Alternatively, multiple TDI sensors could also be used stacked close together. It is necessary to introduce a variable amount of optical path difference between each scan lines either by shifting the aperture array or introducing a difference in compensator thickness in a media such as glass between the aperture arrays which are in a plane and the end of the object imager closest to the aperture array. The result is multiple separate planes that are conjugated to separate z heights at the wafer or sample surface S. In this case where imaging occurred as to multiple heights on a given pass, the surface height calculation and the bump height calculation will involve only one pass each.

In yet another alternative embodiment, two modes of speed are provided. A precise mode is provided where scanning occurs as to every die in either or both surface elevation determination and bump elevation determination. A faster mode is provided where scanning as to wafer surface elevation is performed only in one or a few places along the wafer and interpolation is used to calculate the surface over the remaining surface including at the die.

In even yet another embodiment, single pass height determination is performed. Specifically, only one pass or scan occurs and gray scale variation is used to determine the height of each bump. As a result, only one scan is used at one z axis elevation, followed by interpolation on a gray scale.

Accordingly, the invention as described above and understood by one of skill in the art is simplified, provides an effective, safe, inexpensive, and efficient device, system and process which achieves all the enumerated objectives, provides for eliminating difficulties encountered with prior devices, systems and processes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

We claim:

1. A process of inspecting a surface including bumps thereon, the process comprising:

scanning a surface using optics and a camera capable of determining light intensity for each pixel viewed;

correlating a first pixel with a first surface location;

measuring the light intensity at the first pixel at a first elevation;

measuring the light intensity at the first pixel at a second elevation; and determining an elevation of the surface using a Gaussian curve based upon the light intensities measured at the first and second elevations at at least the first pixel upon confirming that the light intensities measured at the first pixel at the first and second elevations are not indicative of an out of focus position.

2. The process of claim 1 further comprising:

scanning at least particular portions of a surface believed to contain protrusions extending outward from the surface using optics and a camera capable of determining light intensity for each pixel viewed;

measuring the light intensity at each pixel at a third elevation;

measuring the light intensity at each pixel at a fourth elevation; and determining the elevation of the protrusions using a Gaussian curve based upon the light intensities measured at the third and fourth elevations at each pixel.

3. The process of claim 2 further comprising:

determining the height of a protrusion by calculating the difference between the elevation of a protrusion and the elevation of the surface.

4. The process of claim 1 wherein an inspection device is used to perform the scanning and includes:

a light source;

a beamsplitter for receiving light from the light source and redirecting said light;

an aperture array for receiving light from the pellicle beamsplitter;

at least one reimager; and a camera for collecting focused light.

5. The process of claim 1, wherein the elevation of the surface is determined based upon light intensity measurements at the first and second elevations for a plurality of pixels.

6. The process of claim 1, wherein a unique Gaussian curve is generated based upon the measure light intensities of the first pixel.

* * * * *